Feb. 3, 1953 — H. L. CLARK — 2,627,206
DENTAL MOUTH MIRROR
Filed Feb. 16, 1952
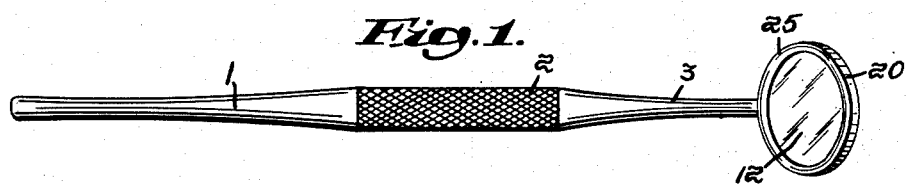
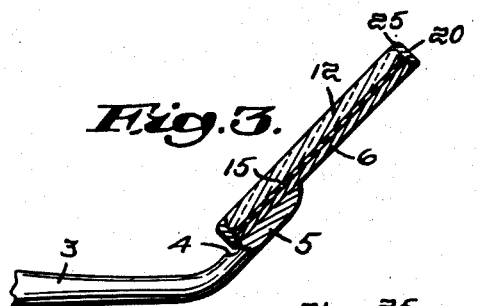
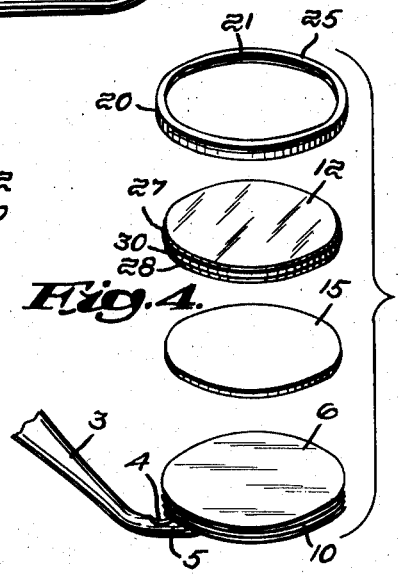
Inventor:
Harold L. Clark
by James R. Hodder
Attorney Patented Feb. 3, 1953

2,627,206

UNITED STATES PATENT OFFICE 2,627,206

DENTAL MOUTH MIRROR

Harold L. Clark, Belmont, Mass.

Application February 16, 1952, Serial No. 271,892

1 Claim. (Cl. 88—104)

My present invention is a novel and improved dental mouth mirror providing a construction for quick renewal and replacement of the mirror element, which construction insures the mirror against breakage during the placement of the new mirror and includes means for waterproofing the reflecting surface.

A requirement of dental mouth mirrors involves extremely severe and difficult usage. Such dental mirrors must be sturdy in construction, capable of holding down and pushing back a patient's tongue or cheeks, and so made as to withstand repeated sterilizing in boiling liquid, steam, or the like, as well as constituting an accurate reflecting surface.

Such severe usage for a relatively delicate mirror and handle constantly tends to mar the mirror's surface or damage the reflecting coating on the back by water or steam during the sterilizing process and requires constant renewal of the mirror element in the device.

Heretofore, it has been customary to enclose the mirror in a non-removable metal case, which latter is attached to the handle by a threaded or other detachable connection, requiring the removal and discarding of the entire unit of glass and enclosing metal, and replacing the same with a completely new unit.

Various efforts have been made to enable a mirror to be renewed and replaced as by a clamping rim, which clamping part has extensions threaded into the main handle of the device; but such prior constructions have proven unsatisfactory, due to expense, difficulty in handling, in damage or breakage in replacing glass, and also permitting water, steam, or cleansing liquid to reach and damage the silver or other reflecting coating on the back of the glass.

My present invention obviates the difficulties above briefly outlined and provides a strong, novel, and attractive construction which enables the removal of a mirrored glass and replacement with a new one without discarding the encircling metal case and without utilizing clamping devices which often would squeeze and break the glass. By my provision of novel means, I protect the reflecting coating as well as the edge portions of the glass element.

In carrying out my present invention, I provide a handle and a supporting disc at an appropriate angle—30° to 50°—relatively between disc and handle, which are rigidly connected and, therefore, of sturdy construction.

The disc is a base or support to receive a removable mirror, said disc being of sufficient thickness to be threaded and to receive a correspondingly threaded and encircling ring or bezel. This ring or bezel has an inturned flange providing less diameter than that of the mirror to be incorporated therewith, and the mirror itself is assembled, preferably, as a pre-attached unit with a thin waterproof layer of rubber, plastic, waterproofed paper, or the like, which is important in protecting the reflecting coating on the glass and also affording a cushioning self-seating of the glass as it is assembled on the supporting disc by the threading of the ring or bezel onto the disc.

As great difficulty has been experienced heretofore with the edge of the glass splintering when assembling it in the holding unit, I provide the edge of the glass mirror with a double bevel—one around the top and one around the lower edge—and, preferably, I have the flange of the ring or bezel similarly bevelled to fit on the uppermost bevelled edge of the mirror. Said ring or bezel is also provided with a flat contacting surface to engage the periphery of the mirror between the bevelled portions, thereby permitting a firm engagement when replacing a marred mirror.

The mirror element is the least expensive and the only part that needs constant replacement, and by means of my improved and novel construction this replacing operation, as well as protecting the waterproofed mirror in the holder, is readily accomplished.

Referring to the drawings illustrating a preferred embodiment of my present invention:

Fig. 1 is a plan view of my improved dental mouth mirror;

Fig. 2 is a side view;

Fig. 3 is an enlarged fragmentary view in cross-section of the mirror-holding portion;

Fig. 4 is a view of the complete parts to be assembled; and

Fig. 5 is a still further enlarged fragmentary view in cross-section of the mirror and its yielding waterproofing, backing supporting disc, and holding bezel.

As shown in the drawings, the handle 1 may be of any suitable or desired length and contour, usually round, and preferably with a knurled gripping part 2 and an operative end 3, which latter has an angular and flattened portion 5 welded or otherwise permanently secured to a supporting base or disc 6. It is important to have the mirror held closely adjacent the angular part 5, which angle between the parts 3 and 5 is ordinarily at from 30° to 50°, a set of such dental mouth mirrors being usually provided with varying angles for facility in use. The edge of the support disc 6 is threaded, as indicated at 10, which disc has its upper surface flat and relatively smooth to receive and support the mirror 12, which is of substantially similar diameter to that of the top of the base 6.

I prefer to supply a yielding non-metallic element 15 between the inner portion of the mirror 12 and the top of the supporting base 6, which preferably also is united, as by adhesive, to the under surface of the mirror 12 so that the mirror and the yielding element 15 are united, which element constitutes a cushioning and self-seating feature as well as a waterproofing and protecting cover for the reflective coating on the mirror 12, as previously noted.

A ring or bezel 20 is provided of appropriate diameter with internal threads 21 formed on the lower portion to register with the external threads 10 on the base, and with the upper inner part of the ring 20 formed with a smooth surface 22 and an inturned flange 25 around the top of the ring to extend over and engage the top portion of the mirror 12. This mirror, in turn, preferably has the edge bevelled at the top, as shown at 27, which approximately corresponds with the bevel on the inturned flange 25.

Also I prefer to form a bevel 28 around the lower edge of the mirror 12, thus leaving a central flat rim 30 of slightly less diameter than that of the smooth portion 22 on the inner and upper part of the ring or bezel 20.

The removal and replacement of the mirror 12 is readily accomplished by simply unscrewing the bezel 20, dropping out the damaged glass 12 and its attached layer 15, placing a new one in the bezel while held upside-down, with the inturned flange 25 in position to receive the top surface of the mirror 12 being inserted; and thereupon assembling the base 6 and ring 20 together by threading one upon the other. The yielding layer 15 automatically effects a self-seating of the glass 12 when forced down on the base 6 by pressure of the inturned flange 25. This flange being of a substantially similar surface to that of the top bevel 27 in the glass, eliminates the danger of splitting, fracturing, or damaging the glass of the mirror while thus being assembled.

In order to permit the threaded ring to be assembled on the base 6, irrespective of the thickness of the mirror 12 or of the yielding layer 15, I may form a slight notch 4 in the upper surface of the part 5, as shown in Figs. 3 and 4, thus still further insuring the self-seating of the mirror and yielding layer 15 on the base 6.

This yielding washer has a further desirable function in that the pressure exerted by tightening the ring 20 will compress the washer 15 and thus constitute a yielding tension to hold the ring 12 against unthreading or loosening, acting as an automatic self-locking feature between the cooperating threads on the ring and base by the spring-like or yielding tension created by the compression of the yielding layer 15. In the drawings I have overdrawn somewhat the thickness of this layer 15, which may be any thickness desired.

Preferably I form the ring or bezel 20 of a non-reflecting material or at least have the inturned flange and rim 25 of non-reflecting surface so that the same will not interfere with the light reflections on the mirror itself, thereby affording a more correct and desirable image during the operative use of the same.

I claim:

A dental mouth mirror comprising a removable mirror with bevelled edges along its top and bottom, a base of slightly greater area than that of the mirror, a handle rigidly attached at a predetermined angle to said base, said base having external threads around its periphery, a corresponding internally threaded ring-like bezel for interlocking on the threads of said base, said ring-like bezel having a width approximately equal to the thickness of both base and mirror and being formed with an internally extending flange on its top edge portion, said mirror fitting within the ring-like bezel and being engaged by said internal flange, a yielding and compressible layer secured to the lower surface of said mirror to contact with the base, the pressure of said flange on the mirror by the action of threading the ring-like bezel on said base effecting a self-seating action of the mirror on the base thru compression of the yielding element, which yielding element simultaneously locks said threaded base and ring-like bezel together by the compressive tension of the same.

HAROLD L. CLARK.

REFERENCES CITED

The following references are of record in the file of this patent:

UNITED STATES PATENTS

| Number | Name | Date |
|---|---|---|
| 516,092 | Hills | Mar. 6, 1894 |
| 531,795 | Green | Jan. 1, 1895 |
| 1,843,067 | De Terra | Jan. 26, 1932 |
| 1,909,853 | Dalton | May 16, 1933 |
| 2,140,005 | Greenberg | Dec. 13, 1938 |

FOREIGN PATENTS

| Number | Country | Date |
|---|---|---|
| 103,985 | Austria | Aug. 25, 1926 |